United States Patent Office 3,795,710
Patented Mar. 5, 1974

3,795,710
PROCESS FOR PREPARING FLUORO-HALO-
GENATED PROPANE DERIVATIVES AND
USE THEREOF
Laurent Seigneurin, Salindres, France, assignor to Produits Chimiques Pechiney-Saint-Gobain, Neuilly-sur-Seine, France
No Drawing. Continuation of application Ser. No. 313,444, Oct. 3, 1963. This application Apr. 16, 1968, Ser. No. 721,600
Claims priority, application France, Oct. 9, 1962, 911,675
Int. Cl. C07c 17/28, 19/08
U.S. Cl. 260—653                                    5 Claims

ABSTRACT OF THE DISCLOSURE

The reaction of fluorinated or fluorinated-chlorinated ethylene compounds with chlorinated methane compounds in the preparation of fluoro-chlorinated propane compounds by the use of gallium chloride or gallium bromide or mixtures thereof as the catalyst at a temperature within the range of 60° to 150° C. and a pressure within the range of 6 to 30 kg./cm.$^2$ to effect substantially complete conversion to the fluoro-chlorinated propane compounds with minimum side reactions.

---

This is a continuation of my copending application Ser. No. 313,444, filed Oct. 3, 1963, and entitled "Process for Preparing Fluoro-Halogenated Propane Derivatives and Use Thereof."

This invention relates to a process for the preparation of fluoro halogenated propane derivatives and it relates more particularly to the preparation of such fluoro halogenated propane derivatives by condensation reaction of a halogenated methane derivative with a fluorinated or fluorochlorinated, brominated and/or iodinated ethylene derivative.

It is well known to obtain halogenated propane derivatives by condensation of halogenated methane derivatives with ethylene derivatives in the presence of such catalysts as $BF_3$, $ZnCl_2$, $FeCl_3$, and preferably $AlCl_3$.

However, the use of aluminum chloride catalyst leads to the formation of the desired fluoro halogenated propane derivative in admixture with other reaction products from which it is difficult and expensive to separate and in which the desired end product is secured in low yields. This drawback is set forth on p. 40 of the publication entitled "Aliphatic Fluorine Compounds," by A. M. Lovelace, Douglas A. Rausch and W. Postelnek, published by Reinhold Publishing Corporation, New York, N.Y., in 1958. Another drawback resulting from the use of aluminum chloride stems from the ready exchange of halogens during the catalytic reaction between the chlorine atoms of the aluminum chloride and fluorine atoms of the initial fluorinated compound or the fluorinated reaction product, as described on p. 190 of the publication entitled "Chemistry of Organic Fluorine Compounds," by Milos Hudlicky, published by Pergamon Press in 1961.

It is an object of this invention to remedy the serious drawbacks previously described and more particularly the drawback which results from the exchange between the chlorine atoms of aluminum chloride and the fluorine atoms of the fluorinated compound, and thus rendering it possible to secure the desired fluoro halogenated propane derivatives with remarkable selectivity and high yield under working conditions considerably more advantageous than those of the prior art.

Other objects and advantages of this invention will become apparent from the following description.

Generally described, the process, in accordance with the practice of this invention, consists in reacting a fluorinated or fluoro-halogenated ethylene derivative with a halogenated methane derivative in the presence of gallium chloride and/or gallium bromide as the catalyst.

In accordance with the invention, the halogenated derivatives are reacted in molar proportions corresponding to the ratio of fluorinated or fluoro-halogenated ethylene derivative to the halogenated methane derivative ranging from 0.1 to 1; in the presence of gallium chloride and/or gallium bromide, in which the catalyst is employed in amounts within the range of 1 to 20 percent by weight of the fluorinated or fluoro-halogenated ethylene derivative, and at a temperature within the range of 60–150° C., and under a pressure within the range of 6–30 kg./cm.$^2$. The reaction is carried out under the conditions described for a time within the range of 1–120 hours.

When the reaction is over, the mixture of product obtained is submitted to the usual washing, decanting, drying, and finally distillation steps which enables isolation of the desirable end product of the reaction.

A material advantage of the use of gallium chloride and/or gallium bromide, in accordance with the practice of this invention, by comparison with the process which makes use of aluminum chloride stems from the fact that gallium chloride and/or gallium bromide are capable of being recovered almost entirely. Recovery from the mixture of the reaction products is achieved during the washing step, for example by the use of an acid, preferably in the form of an aqueous solution of hydrochloric acid, whereby recovery is achieved in the form of an aqueous hydrochloric acid solution of gallium which can be treated according to known means to recuperate gallium as gallium chloride and/or bromide. The latter can then be reacted as catalyst in the described reaction.

Another advantage resulting from the use of gallium chloride and/or gallium bromide is that the catalytic reaction can be carried out in a homogeneous phase.

In a preferred embodiment of the process of this invention, the two initial reactants are reacted by stirring in a closed vessel in a molar ratio of 0.5 to 0.8 mole fluorinated or fluoro-halogenated ethylene derivative to one mole halogenated methane derivative in the presence of gallium chloride present in an amount within the range of 8–12 percent by weight of the fluorinated or fluoro-halogenated ethylene derivative and at a temperature within the range of 75–90° C. under the pressure generated during the reaction and for a period of time within the range of 12–24 hours.

The following will illustrate fluorinated or fluoro-halogenated ethylene derivatives which may be employed as an ingredient in the reaction, namely: tetrafluorethylene, trifluorochlorethylene, difluorodichlorethylene, preferably 1,2-difluorodichlorethylene, and the following are illustrative of the halogenated methane derivatives which may be employed, namely: carbon tetrachloride, chloroform, methylene chloride, and the like.

In the particular case of the condensation reaction of 1,2 difluorodichlorethylene and carbon tetrachloride, 1,2 difluorohexachloropropane is obtained in very satisfactory yields.

The invention also relates to the uses which can be made of fluoro-halogenated propane derivatives prepared by the practice of this invention and more particularly as a dielectric liquid or as a hydraulic or heat exchange fluid.

The following examples are given by way of illustration, but not by way of limitation, of the invention.

EXAMPLE 1

In a 5 liter steel autoclave, the following compounds are introduced in the amounts set forth.

|                              | Grams |
|------------------------------|-------|
| 1,2 difluoro 1,2 dichloroethylene | 800   |
| Carbon tetrachloride         | 1800  |
| Gallium chloride             | 100   |

The mixture of ingredients is heated to a temperature of 80° C. and the materials are maintained at this temperature for reaction for 24 hours.

At the start of the reaction, the manometer shows a pressure of about 10 kg./cm.$^2$, whereas, at the end of the reaction, the pressure is only about 6 kg./cm.$^2$.

The autoclave content is degasified and washed with 300 grams per liter of aqueous hydrochloric acid solution, decanted and dried by means of calcium chloride. The dried product is distilled first under atmospheric pressure to effect the removal of lighter products or lower molecular weight compounds and the unreacted carbon tetrachloride and thereafter under a pressure of 13 mm. of mercury. In this way, 1020 grams of product are obtained having the following physical characteristics which correspond to 1,2 difluorohexachloropropane which is secured as the end product.

| Boiling point under 760 mm. of Hg | °C | 195 |
|---|---|---|
| Melting point | °C | −55 |
| $n_D^{20}$ | | 1.480 |

The hydrochloric acid washing liquor separated by decantation is submitted under electrolysis under low tension to recover, at the cathode, almost all of the gallium content in a metallic state. A simple chlorination with gaseous chlorine provides gallium chloride which can be used again in a later reaction. When the yield is defined as a weight ratio of the 1,2 difluorohexachloropropane obtained to the sum of the corresponding weights of the stoichiometric quantities of the two reactive ingredients, that is to say 1 mole of 1,2 difluorodichloroethylene for 1 mole of carbon tetrachloride, the value will equal 60 percent.

In another example, under the same working conditions as those described, aluminum chloride was used instead of gallium chloride as catalyst. The desired product is not capable of being isolated, even by different procedures, wherein the reaction pressure and temperature have been changed.

EXAMPLE 2

As a basis for comparison, three reactions were carried out between carbon tetrachloride and 1,2 difluorodichloroethylene in which use was made respectively of gallium chloride, aluminum chloride and benzoyl peroxide as catalysts. The working conditions are summarized in the following table.

TABLE I

|  | Catalyst | | |
|---|---|---|---|
|  | Gallium chloride | Aluminum chloride | Benzoyl peroxide |
| Weight in grams | 100 | 75.5 | 18 |
| $CCl_4$ in moles | 12 | 12 | 12 |
| $CFCl=CFCl$ in moles | 6 | 6 | 6 |
| Time of the reaction in hours | 9 | 19 | 7.3 |
| Temperature in °C | 100 | 100 | 100 |
| Pressure | Pressure of the reaction carried out in a 5 liter autoclave | | |

Table II, hereinafter set forth, summarizes the products obtained after elimination of the light products and carbon tetrachloride, as by means of distillation.

TABLE II

| Catalyst used— | Product obtained with its physical characteristics |
|---|---|
| Gallium chloride | 520 g. of $CFCl_2\text{-}CFCl\text{-}CCl_3$ — B.P.=75–80° C. under 13 mm. Hg. B.P.=195° C. under 760 mm. Hg. M.P.=−55° C. $n_D^{22}$=1.480. |
| Aluminum chloride | 70 g. of residue after distillation of desired product 80 g. of an isomer mixture of $C_3F_2Cl_6$ and $C_3FCl_7$ — B.P.=60–103° C. under 13 mm. Hg. M.P.=35° C. to −7° C. $n_D^{21}$=1.486 to 1.518. |
| Benzoyl peroxide | 52 g. of residue after distillation of desired product 65 g. of an isomer mixture of $C_3F_2Cl_6$ and $C_3FCl_7$ — B.P.=>100° C. under 760 mm. Hg. M.P.=−40° to −65° C. $n_D^{21}$=1.485 to 1.515. |

It will be noted from the foregoing that gallium chloride provides the desired product at a yield and in a purity considerably higher than that obtained with aluminum chloride or benzoyl peroxide.

It will be apparent from the foregoing that I have provided a new and efficient means for producing fluoro-halogenated propane derivatives at high yields and in a state from which the desired end product can be easily separated.

It will be understood that changes may be made in the details of formulation and reaction without departing from the spirit of the invention, especially as defined in the following claims.

I claim:

1. In the process of preparing fluoro-chlorinated propane compounds by the reaction of a compound selected from the group consisting of fluorinated and fluoro-chlorinated ethylene compounds with chlorinated methane compounds, the improvement which comprises catalyzing the reaction with a catalytic compound selected from the group consisting of gallium chloride, gallium bromide and mixtures thereof.

2. A process in accordance with claim 1 wherein the ratio of the ethylene compounds to the methane compounds ranges from 0.1 to 1.0, and in which the catalyst is employed in amounts within the range of 1 to 20 percent by weight of the ethylene compounds, and wherein the reaction is carried out at a temperature within the range of 60° to 150° C., under a pressure within the range of 6 to 30 kg./cm.$^2$, with the reaction continuing for from 1 to 120 hours.

3. A process in accordance with claim 1 wherein the ratio of the ethylene compounds to the methane compounds ranges from 0.5 to 0.8, and in which the catalyst is employed in amounts within the range of 8 to 12 percent by weight of the ethylene compounds, and wherein the reaction is carried out at a temperature within the range of 75° to 90° C., under a pressure within the range of 6 to 30 kg./cm.$^2$, with the reaction continuing for from 12 to 24 hours.

4. A process as claimed in claim 1 in which the ethylene compound is selected from the group consisting of tetrafluoroethylene, trifluorochlorethylene, difluorodichlorethylenes, and 1,2-difluorodichlorethylene.

5. A process as claimed in claim 1 in which the halogenated methane compound is selected from the group consisting of chloroform, carbon tetrachloride and methylene chloride.

References Cited

FOREIGN PATENTS 581,254 10/1946 Great Britain _____ 260—653.8

OTHER REFERENCES

Ulich et al.: Chemical Abstracts 29, 7768[9]–7769[a] (1935).

DANIEL D. HORWITZ, Primary Examiner

UNITED STATES PATENT OFFICE
CERTIFICATE OF CORRECTION

Patent No. 3,795,710          Dated   March 5, 1974

Inventor(s)  Laurent Seigneurin

It is certified that error appears in the above-identified patent and that said Letters Patent are hereby corrected as shown below:

Column 4, in Table II, right-hand column, line 4, please correct the notation "$n_D^{22}$" to read -- $n_D^{20}$ --

Column 4, in Table II, right-hand column, line 8, please correct the notation "$n_D^{21}$" to read -- $n_D^{20}$ --

Column 4, in Table II, right-hand column, line 12, please correct the notation "$n_D^{21}$" to read -- $n_D^{20}$ --

Signed and sealed this 2nd day of July 1974.

(SEAL)
Attest:

EDWARD M. FLETCHER,JR.          C. MARSHALL DANN
Attesting Officer               Commissioner of Patents